United States Patent
Liu

(10) Patent No.: US 12,062,014 B2
(45) Date of Patent: Aug. 13, 2024

(54) FLEXIBLE PRODUCTION METHOD AND DEVICE FOR WAREHOUSE, AND COMPUTER READABLE STORAGE MEDIUM

(71) Applicant: BEIJING JINGDONG QIANSHI TECHNOLOGY CO., LTD., Beijing (CN)

(72) Inventor: Shuqing Liu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 399 days.

(21) Appl. No.: 17/636,991

(22) PCT Filed: Apr. 21, 2020

(86) PCT No.: PCT/CN2020/085986
§ 371 (c)(1),
(2) Date: Feb. 21, 2022

(87) PCT Pub. No.: WO2021/036298
PCT Pub. Date: Mar. 4, 2021

(65) Prior Publication Data
US 2022/0358452 A1    Nov. 10, 2022

(30) Foreign Application Priority Data
Aug. 26, 2019 (CN) .......................... 201910789808.5

(51) Int. Cl.
G06Q 10/087 (2023.01)
B65G 1/137 (2006.01)
(Continued)

(52) U.S. Cl.
CPC ......... *G06Q 10/087* (2013.01); *B65G 1/1378* (2013.01); *G06Q 10/06316* (2013.01); *G06Q 50/04* (2013.01)

(58) Field of Classification Search
CPC ........... G06Q 10/087; G06Q 10/06316; G06Q 50/04; G06Q 10/0875; B65G 1/1378; Y02P 90/60; Y02P 90/30
See application file for complete search history.

(56) References Cited

U.S. PATENT DOCUMENTS

| 2016/0229631 A1 | 8/2016 | Kimura et al. |
| 2017/0270466 A1 | 9/2017 | Kao et al. |
| 2021/0398237 A1 | 12/2021 | Wan et al. |

FOREIGN PATENT DOCUMENTS

| CN | 107563570 A | 1/2018 |
| CN | 108341204 A | 7/2018 |

(Continued)

OTHER PUBLICATIONS

"International Search Report and English language translation", International Application No. PCT/CN2020/085986, Jul. 21, 2020, 7 pp.

(Continued)

*Primary Examiner* — A. Hunter Wilder
(74) *Attorney, Agent, or Firm* — Myers Bigel, P.A.

(57) ABSTRACT

The present disclosure relates to a flexible production method and device for a warehouse, and a computer readable storage medium. The method comprises dividing the warehouse into a human-machine collaborative operation area and an automated guided vehicle operation area, wherein in the automated guided vehicle operation area, the automated guided vehicle performs operations, and in the (Continued)

human-machine collaborative operation area, the automated guided vehicle and the operator perform collaborative operations.

14 Claims, 4 Drawing Sheets

(51) Int. Cl.
*G06Q 10/0631* (2023.01)
*G06Q 50/04* (2012.01)

(56) References Cited

FOREIGN PATENT DOCUMENTS

| | | |
|---|---|---|
| CN | 109345180 A | 2/2019 |
| CN | 109359924 A | 2/2019 |
| JP | 2020040774 A | 3/2020 |
| WO | 2015097736 A1 | 7/2015 |
| WO | 2018140408 A1 | 8/2018 |

OTHER PUBLICATIONS

"Notice of Reasons for Rejection and English language translation", JP Application No. 2022-513322, Jan. 30, 2023, 7 pp.

The warehouse is divided into a human-machine collaborative operation area and an AGV operation area, wherein in the AGV operation area, the AGV performs operations, and in the human-machine collaborative operation area, the AGV and the operator perform collaborative operations — 31

FLEXIBLE PRODUCTION METHOD AND DEVICE FOR WAREHOUSE, AND COMPUTER READABLE STORAGE MEDIUM

CROSS-REFERENCE TO RELATED APPLICATIONS

The present application is a U.S. National Stage Application under 35 U.S.C. § 371 of International Patent Application No. PCT/CN2020/085986, filed on Apr. 21, 2020, which is based on and claims priority to China Patent Application No. 201910789808.5 filed on Aug. 26, 2019, the disclosures of both of which are incorporated by reference herein in their entireties.

TECHNICAL FIELD

The present disclosure relates to the field of logistics, in particular to a flexible production method and device for a warehouse, and a computer-readable storage medium.

BACKGROUND

FIG. 1 is a schematic view of the layout of the AGV (Automated Guided Vehicle) robot warehouse in some embodiments of the related art. As shown in FIG. 1, the length and width of the gray grid and the white grid are both 1 meter, wherein the racks which are settled on the gray grid are generally divided into five layers, each layer has a height of about 40 cm, and a plurality of storage grids may be provided in each layer. The white grid is a route along which the AGV carries the racks to travel. After the AGV receives an outfeed instruction from the system, the racks are carried to the workstation, so that the operators at the workstation complete sorting of the products according to a prompt of the system. During stock entry, the system stores the products on the racks in a scattered manner according to the sales volume of SKU (Stock Keeping Unit), so that the operators place the products into the corresponding layers and storage grids of the racks according to the instruction of the system, and AGV carries the racks from the workstation to the storage location where the gray grid is located.

SUMMARY

According to one aspect of the present disclosure, a flexible production method for a warehouse is provided. The method comprises the steps of: dividing the warehouse into a human-machine collaborative operation area and an AGV operation area; and allocating products in stock between the human-machine collaborative operation area and the AGV operation area according to a predetermined rule, wherein the step of allocating products in stock between the human-machine collaborative operation area and the AGV operation area according to a predetermined rule comprises: determining whether a stock depth of the products is greater than or equal to a predetermined stock depth; determining whether an inventory of the products is greater than a safety inventory of the products in the case where the stock depth of the products is greater than or equal to the predetermined stock depth; and storing the products in the human-machine collaborative operation area and the AGV operation area at the same time in the case where the stock depth of the products is greater than or equal to the predetermined stock depth, and the inventory of the products is greater than the safety inventory of the products.

In some embodiments of the present disclosure, the step of storing the products in the human-machine collaborative operation area and the AGV operation area at the same time comprises: storing the products with a number equal to the safety inventory on a first predetermined number of racks in the AGV operation area in a scattered manner, wherein the first predetermined number is the number of outfeed workstations in the entire warehouse; and storing the entire rack of a first remaining number of the products in the human-machine collaborative operation area, wherein the first remaining number is a difference between the inventory of the products and the safety inventory of the products.

In some embodiments of the present disclosure, the step of storing the entire rack of a first remaining number of the products in the human-machine collaborative operation area comprises: determining whether a second remaining number is greater than or equal to the first remaining number, wherein the second remaining number is the number of the products that may be stored in the remaining storage space of the human-machine collaborative operation area; storing the entire rack of a first remaining number of the products in the human-machine collaborative operation area in the case where the second remaining number is greater than or equal to the first remaining number; and storing the entire rack of a second remaining number of the products in the human-machine collaborative operation area, and the entire rack of a third remaining number of the products is stored in the automatic AGV operation area in the case where the second remaining number is less than the first remaining number, wherein the third remaining number is a difference between the first remaining number and the second remaining number.

In some embodiments of the present disclosure, the step of allocating products in stock between the human-machine collaborative operation area and the AGV operation area according to a predetermined rule further comprises: storing all the products in the inventory of the products on a first predetermined number of racks of the AGV operation area in a scattered manner in the case where the stock depth of the products is greater than or equal to the predetermined stock depth, and the inventory of the products is less than or equal to the safety inventory of the products, wherein the first predetermined number is the number of outfeed workstations in the entire warehouse.

In some embodiments of the present disclosure, the step of allocating products in stock between the human-machine collaborative operation area and the AGV operation area according to a predetermined rule further comprises: determining whether an inventory of the products is greater than a safety inventory of the products in the case where the stock depth of the products is less than the predetermined stock depth; and storing the products with a number equal to the safety inventory on the first predetermined number of racks of the AGV operation area in a scattered manner in the case where the stock depth of the products is less than the predetermined stock depth and the inventory of the products is greater than the safety inventory of the products, wherein the first predetermined number is the number of outfeed workstations in the entire warehouse; the entire rack of a first remaining number of the products is stored in the AGV operation area, wherein the first remaining number is a difference between the inventory of the products and the safety inventory of the products.

In some embodiments of the present disclosure, the step of allocating products in stock between the human-machine collaborative operation area and the AGV operation area according to a predetermined rule further comprises: storing all the products in the inventory of the products on a first predetermined number of racks of the AGV operation area in a scattered manner in the case where the stock depth of the products is less than the predetermined stock depth, and the inventory of the products is less than or equal to the safety inventory of the products, wherein the first predetermined number is the number of outfeed workstations in the entire warehouse.

In some embodiments of the present disclosure, the step of storing the products with a number equal to the safety inventory on a first predetermined number of racks in the AGV operation area in a scattered manner comprises: storing a third predetermined number of the products on the preceding second predetermined number of racks in the first predetermined number of racks, wherein the second predetermined number is equal to the first predetermined number minus 1, and the third predetermined number is obtained by rounding up the quotient of the safety inventory and the second predetermined number; and storing a fourth predetermined number of the products on the last rack in the first predetermined number of racks, wherein the fourth predetermined number is a difference between the safety inventory and the fifth predetermined number, and the fifth predetermined number is the product of the second predetermined number and the third predetermined number.

In some embodiments of the present disclosure, the flexible production method further comprises the step of: determining whether a current order is the first type of order or the second type of order; and instructing an operator to complete the sorting of the products in the human-machine collaborative operation area in the case where the current order is the first type of order or the second type of order.

In some embodiments of the present disclosure, the step of determining whether a current order is the first type of order comprises: determining the order as the first type of order in the case where the type of the products contained in an order is 1, the total demand number of the products in an order is greater than or equal to 1, the stock depth of a corresponding product in an order is greater than or equal to a predetermined stock depth, and the corresponding product in an order is in stock in the human-machine collaborative operation area; or the step of determining whether a current order is the second type of order comprises: determining the order as the second type of order in the case that the demand number of the products in an order is greater than a predetermined demand number of the products, the stock depth of a corresponding product in an order is greater than or equal to a predetermined stock depth, and the corresponding product in an order is in stock in the human-machine collaborative operation area.

In some embodiments of the present disclosure, the flexible production method further comprises the step of: setting a travel route of the AGV and a walking route of the operator in the human-machine collaborative operation area, wherein the AGV travels along the travel route of the AGV, and the operator walks along the walking route of the operator.

In some embodiments of the present disclosure, the flexible production method further comprises the step of: completing the replenishment between the human-machine collaborative operation area and the AGV operation area by using an AGV.

In some embodiments of the present disclosure, the step of completing the replenishment between the human-machine collaborative operation area and the AGV operation area by using an AGV comprises at least one of the following steps, wherein: replenishing the product from the human-machine collaborative operation area to the AGV operation area in the case where the stock depth of a product is greater than or equal to a predetermined stock depth, the inventory of the product in the AGV operation area is lower than the safety inventory of the product, and the product is in stock in the human-machine collaborative operation area; and carrying the rack of the product stored in an entire rack manner from the AGV operation area and replenishing to the human-machine collaborative operation area in the case where the stock depth of a product is greater than or equal to a predetermined stock depth, the inventory of the product in the AGV operation area is greater than the safe inventory of the product, the product stored in an entire rack manner is present in the AGV operation area, and the rack of the product is emptied in the human-machine collaborative operation area.

In some embodiments of the present disclosure, the step of replenishing the product from the human-machine collaborative operation area to the AGV operation area comprises: replenishing the products with a number equal to the safety inventory to a first predetermined number of racks in the AGV operation area in a scattered manner, wherein the first predetermined number is the number of outfeed workstations in the entire warehouse; and In some embodiments of the present disclosure, the condition that the rack of the product is emptied in the human-machine collaborative operation area comprises that the number of racks on which the products are stored in the human-machine collaborative operation area is less than the predetermined number of racks.

According to another aspect of the present disclosure, a flexible production device for a warehouse is provided. The device comprises: a warehouse division module is configured to divide the warehouse into a human-machine collaborative operation area and an AGV operation area; and a stock distributing module configured to allocate the products in stock between the human-machine collaborative operation area and the AGV operation area according to a predetermined rule, wherein the stock distributing module is configured to determine whether the stock depth of the products is greater than or equal to a predetermined stock depth; to determine whether the inventory of the products is greater than the safety inventory of the products in the case where the stock depth of the products is greater than or equal to a predetermined stock depth; and to store the products in the human-machine collaborative operation area and the AGV operation area at the same time in the case where the stock depth of the products is greater than or equal to a predetermined stock depth, and the inventory of the products is greater than the safety inventory of the products.

In some embodiments of the present disclosure, the flexible production device for a warehouse is configured to perform operations for implementing the flexible production method according to any one of the above-described embodiments.

According to another aspect of the present disclosure, a flexible production device for a warehouse is provided. The device comprises: a memory configured to store instructions; and a processor configured to execute the instructions, so that the flexible production device for a warehouse is configured to perform operations for implementing the flexible production method according to any one of the above-described embodiments.

According to another aspect of the present disclosure, a computer readable storage medium is provided, wherein the computer readable storage medium stores computer instructions, which, when executed by a processor, implement the flexible production method according to any one of the above-described embodiments.

BRIEF DESCRIPTION OF THE ACCOMPANYING DRAWINGS

In order to more explicitly explain the embodiments of the present disclosure or the technical solutions in the relevant art, a brief introduction will be given below for the accompanying drawings required to be used in the description of the embodiments or the relevant art. It is obvious that, the accompanying drawings described as follows are merely some of the embodiments of the present disclosure. For those skilled in the art, other accompanying drawings may also be obtained according to such accompanying drawings on the premise that no inventive effort is involved.

DETAILED DESCRIPTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The inventors have found through studies that: in the related art, one SKU usually requires a number of products for a bulk order, and in the case where the products are stored in a completely dispersed manner, the AGV has to carries many racks to complete the picking of a bulk order, so that the efficiency is relatively low.

In large-scale promotion of the related art, the order quantity may generally exceed the peak production capacity of the AGV by several times. With restrictions by the site and layout, the effect of enhancing and improving the production capacity is not significant by increasing the number of the AGVs and the number of workstations.

In view of at least one of the above technical problems, the present disclosure provides a flexible production method and device for a warehouse, and a computer-readable storage medium. The present disclosure will be introduced by specific embodiments below.

Figure 1:
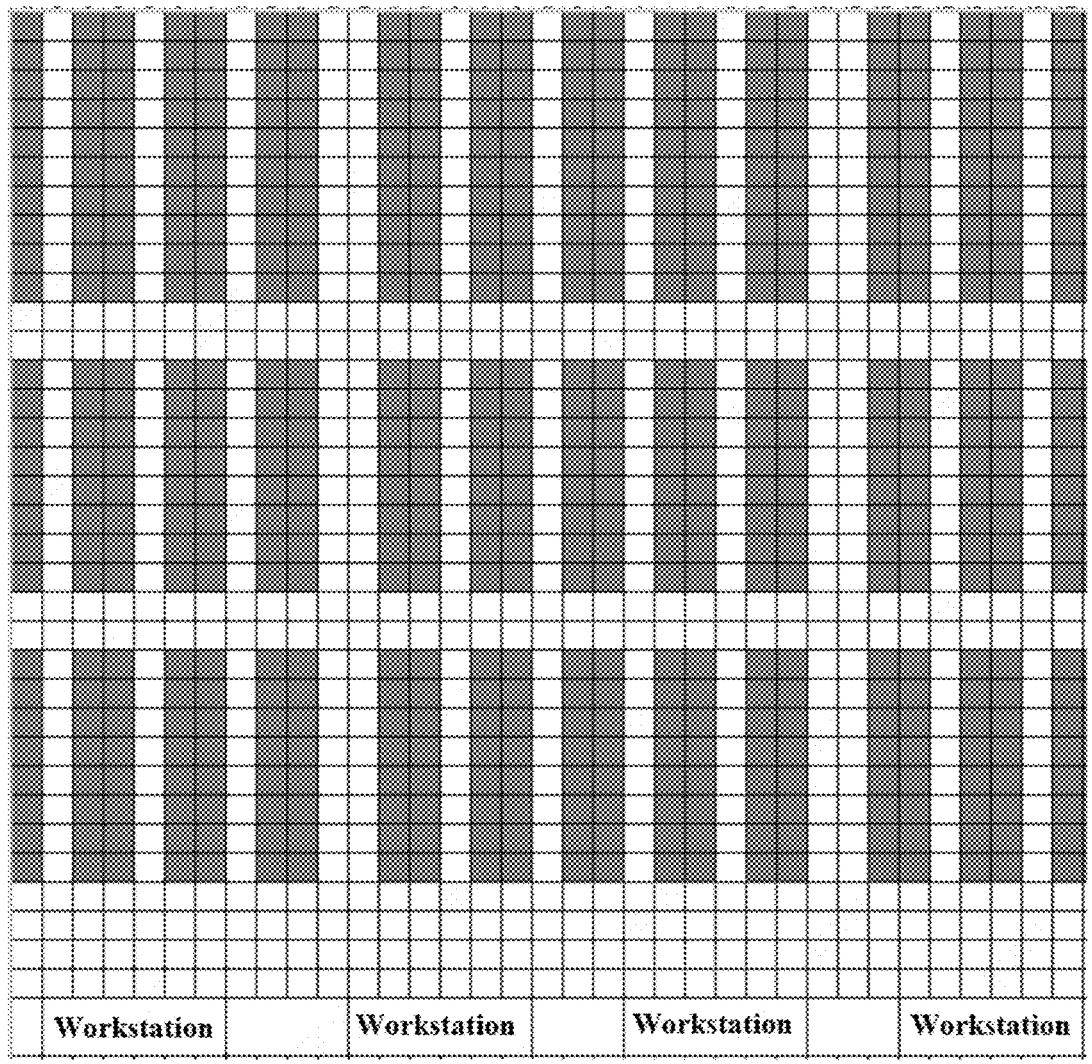
FIG. 1 is a schematic view of the layout of the AGV robot warehouse in some embodiments of the related art.
Figures 2, 3:
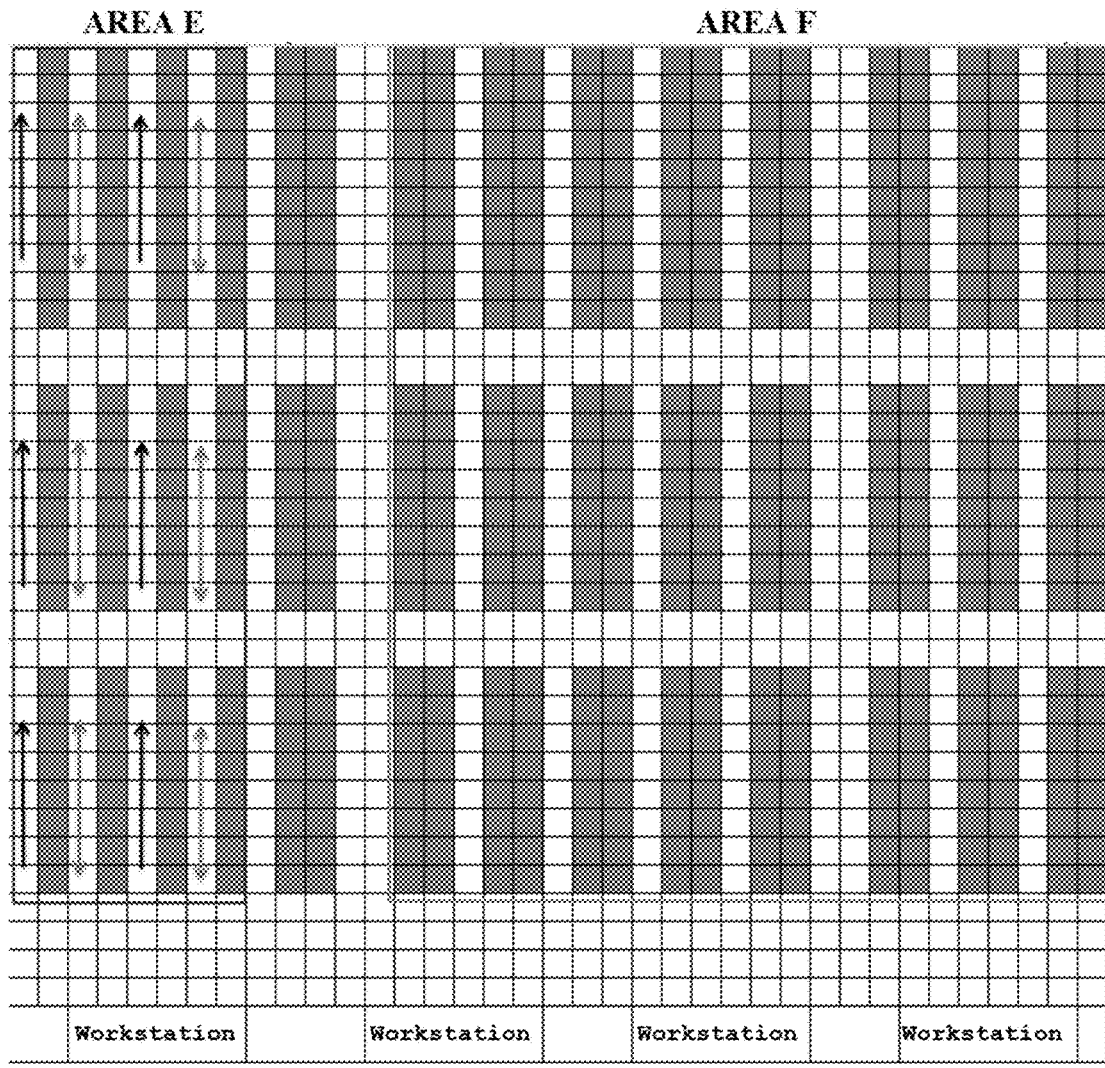
FIG. 2 is a schematic view of some embodiments of the warehouse according to the present disclosure.
FIG. 3 is a schematic view of some embodiments of the flexible production method according to the present disclosure flexible production method.

FIG. 2 is a schematic view of some embodiments of the warehouse according to the present disclosure. The warehouse according to the present disclosure is an AGV robot warehouse. As shown in FIG. 2, the warehouse according to the present disclosure may comprise a human-machine collaborative operation area (area E) and an AGV operation area (area F), wherein:

The AGV operation area (area F) is located on a right side of the warehouse; in the area F, the AGV performs operations.

The human-machine collaborative operation area (area E) is located on a left side of the warehouse; in the area E, the AGV and the operator perform collaborative operations. The one-way arrow in the area E is a travel route of the AGV, and the two-way arrow is a walking route of the operator. The AGV follows a route of the black arrow when replenishing the rack, and after the rack is settled, the empty vehicle may return from underneath the rack. The route of the two-way arrow indicates that the operator may walk in two directions.

In some embodiments of the present disclosure, the warehouse according to the present disclosure may also comprise a flexible production device for a warehouse.

The flexible production device for a warehouse is configured to determine whether the current order is the first type of order or the second type of order; and instruct the operator to complete the sorting of the products in the human-machine collaborative operation area in the case where the current order is the first type of order or the second type of order.

In some embodiments of the present disclosure, the first type of order may be a boom order.

In some embodiments of the present disclosure, the second type of order may be a bulk order.

In some embodiments of the present disclosure, during the promotion, for the first type of order and the second type of order, the flexible production device for a warehouse may instruct the operator to complete the sorting of the products in the route of the two-way arrow in a light color, and may increase or decrease the operators according to the order quantity.

Based on the warehouse provided by the above-described embodiments of the present disclosure, a more flexible solution is provided to address the problems of a bottleneck in the production capacity during big promotion and a low production efficiency for a bulk order. The above-described embodiments of the present disclosure greatly improve the production efficiency for a boom order and a bulk order during promotion. The above-described embodiments of the present disclosure greatly improve the peak production capacity of the warehouse.

The present disclosure greatly improves the production efficiency for a bulk order by dividing the warehouse into a human-machine collaborative operation area and an AGV operation area, by way of the flexible production method.

The above-described embodiments of the present disclosure not only adjust the layout of the AGV robot warehouse, but also form new solutions for stock distribution, outfeed, and replenishment. Next, the flexible production method and device for a warehouse according to the present disclosure will be described by specific embodiments.

FIG. 3 is a schematic view of some embodiments of the flexible production method according to the present disclosure flexible production method. Preferably, this embodiment may be implemented by the flexible production device for a warehouse according to the present disclosure. The method comprises the following steps.

In step 31: the warehouse is divided into a human-machine collaborative operation area and an AGV operation area, wherein in the AGV operation area, the AGV performs operations, and in the human-machine collaborative operation area, the AGV and the operator perform collaborative operations.

In some embodiments of the present disclosure, the flexible production method may further comprise: determining whether the current order is the first type of order or the second type of order; and instructing the operator to complete the sorting of the products in the human-machine collaborative operation area in the case where the current order is the first type of order or the second type of order.

Based on the flexible production method provided by the above-described embodiments of the present disclosure, a more flexible solution is provided to address the problems of a bottleneck in the production capacity during big promotion and a low production efficiency for a bulk order. The operator is instructed to complete the sorting of the products in the human-machine collaborative operation area in the case where the current order is a boom order or a bulk order. Therefore, the above-described embodiments of the present disclosure greatly improve the production efficiency for a boom order and a bulk order during promotion.

Figure 4:
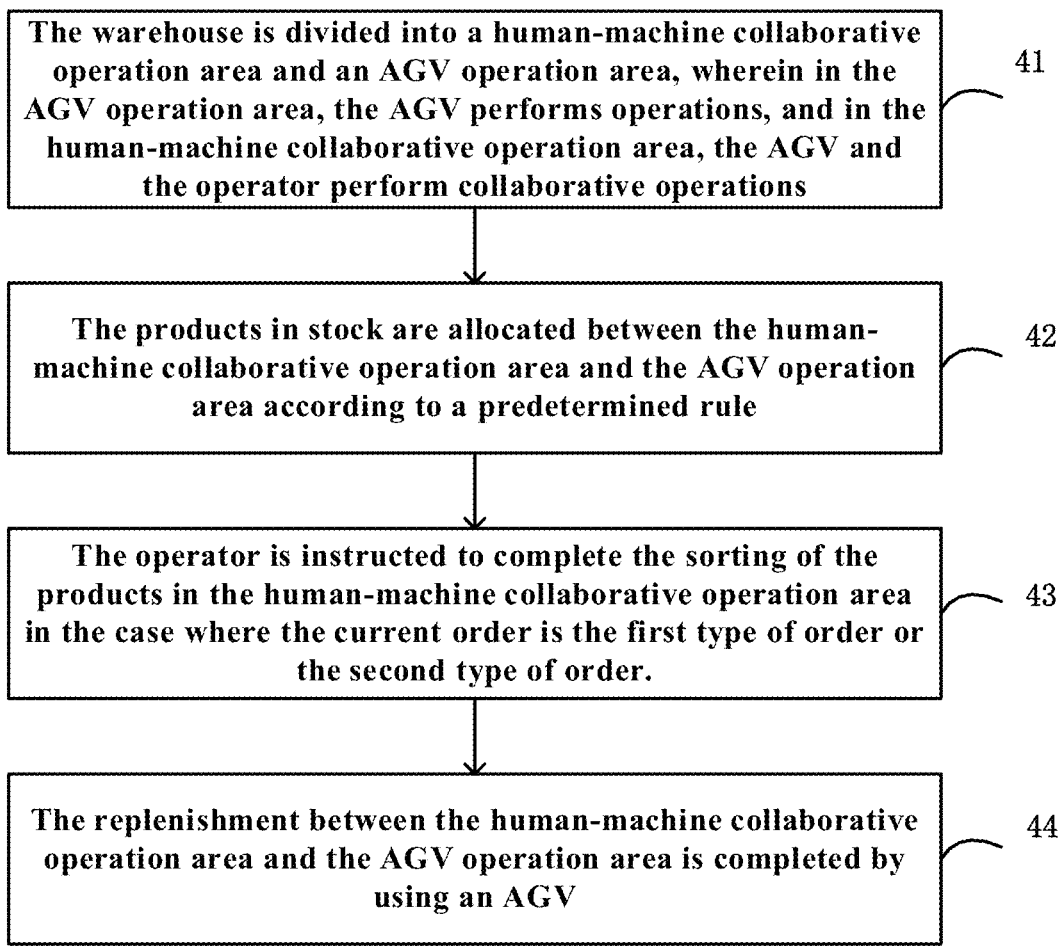
FIG. 4 is a schematic view of other embodiments of the flexible production method according to the present disclosure flexible production method.

FIG. 4 is a schematic view of other embodiments of the flexible production method according to the present disclosure flexible production method. Preferably, this embodiment may be implemented by the flexible production device for a warehouse according to the present disclosure. The method comprises the following steps.

In step 41, the warehouse is divided into a human-machine collaborative operation area and an AGV operation area, wherein in the AGV operation area, the AGV performs operations, and in the human-machine collaborative operation area, the AGV and the operator perform collaborative operations.

In some embodiments of the present disclosure, the flexible production method may further comprise: setting a travel route of the AGV and a walking route of the operator in the human-machine collaborative operation area, wherein the AGV travels along the travel route of the AGV, and the operator walks along the walking route of the operator.

In step 42, the products in stock are allocated between the human-machine collaborative operation area and the AGV operation area according to a predetermined rule.

In some embodiments of the present disclosure, the step 42 may comprise at least one of steps 421 to 427.

In step 421, it is determined whether the stock depth of the products is greater than or equal to a predetermined stock depth.

In some embodiments of the present disclosure, the stock depth is equal to a ratio of the total inventory of the products to the average daily sales volume of the products.

In step 422, it is determined whether the inventory of the products is greater than the safety inventory of the products in the case where the stock depth of the products is greater than or equal to a predetermined stock depth.

In step 423, the products are stored in the human-machine collaborative operation area and the AGV operation area at the same time in the case where the stock depth of the products is greater than or equal to a predetermined stock depth, and the inventory of the products is greater than the safety inventory of the products.

In some embodiments of the present disclosure, in step 423, the step of storing the products in the human-machine collaborative operation area and the AGV operation area at the same time may comprise at least one of step a and step b.

In step a, the products with a number equal to the safety inventory are stored on a first predetermined number of racks in the AGV operation area in a scattered manner, wherein the first predetermined number is the number of outfeed workstations in the entire warehouse.

In step b, the entire rack of a first remaining number of the products is stored in the human-machine collaborative operation area, wherein the first remaining number is a difference between the inventory of the products and the safety inventory of the products.

In some embodiments of the present disclosure, the step b may comprise at least one of steps b1 to b2.

In step b1, it is determined whether a second remaining number is greater than or equal to the first remaining number, wherein the second remaining number is the number of the products that may be stored in the remaining storage space of the human-machine collaborative operation area.

In step b2, the entire rack of a first remaining number of the products is stored in the human-machine collaborative operation area in the case where the second remaining number is greater than or equal to the first remaining number.

In step b3, the entire rack of a second remaining number of the products is stored in the human-machine collaborative operation area, and the entire rack of a third remaining number of the products is stored in the automatic AGV operation area in the case where the second remaining number is less than the first remaining number, wherein the third remaining number is a difference between the first remaining number and the second remaining number.

In step 424, all the products in the inventory of the products are stored on a first predetermined number of racks of the AGV operation area in a scattered manner in the case where the stock depth of the products is greater than or equal to a predetermined stock depth, and the inventory of the products is less than or equal to the safety inventory of the products, wherein the first predetermined number is the number of outfeed workstations in the entire warehouse.

In step 425, it is determined whether the inventory of the products is greater than the safety inventory of the products in the case where the stock depth of the products is less than the predetermined stock depth.

In step 426, the products with a number equal to the safety inventory are stored on the first predetermined number of racks of the AGV operation area in a scattered manner in the case where the stock depth of the products is less than the predetermined stock depth and the inventory of the products is greater than the safety inventory of the products, wherein the first predetermined number is the number of outfeed workstations in the entire warehouse; the entire rack of a first remaining number of the products is stored in the AGV operation area, wherein the first remaining number is a difference between the inventory of the products and the safety inventory of the products.

In step 427, all the products in the inventory of the products are stored on the first predetermined number of racks of the AGV operation area in the case where the stock depth of the products is less than the predetermined stock depth and the inventory of the products is less than or equal to the safety inventory of the products, wherein the first predetermined number is the number of outfeed workstations in the entire warehouse.

In some embodiments of the present disclosure, in the step a, the step 424, the step 426, and the step 427, the step of storing the products with a number equal to the safety inventory on the first predetermined number of racks of the AGV operation area in a scattered manner may comprise: storing a third predetermined number of the products on the preceding second predetermined number of racks in the first predetermined number of racks, wherein the second predetermined number is equal to the first predetermined number minus 1, and the third predetermined number is obtained by rounding up the quotient of the safety inventory and the second predetermined number; and storing the fourth predetermined number of the products on the last rack in the first predetermined number of racks, wherein the fourth predetermined number is a difference between the safety inventory and the fifth predetermined number, and the fifth predetermined number is the product of the second predetermined number and the third predetermined number.

In some embodiments of the present disclosure, the step 42 may comprise at least one of steps 42a to 42c.

In step 42a, SKUs with a large stock depth are stored in the area E, and the same SKUs are stored on the concentrated racks as much as possible. If SKUs with a large stock depth cannot be fully stored in the area E, they may be temporarily stored in the area F; SKU with a small stock depth are stored on different racks in the area F according to a certain number of scattered shares (one SKU counts as one share on one rack), and the safety inventory of the products A is defined as Qy (the average sales volume of the products A in Y days is the safety inventory of A, and Y may be a weighted average of a plurality of cycles of Y days). If the stock depth of the products A is T, the total stock is Qx, and the number of outfeed workstations in the entire warehouse is K, then the products A are divided into K shares in the area F and stored on K racks in a scattered manner (in order to satisfy parallel order operations of the products A in K workstations at the same time), and then it is determined whether the products A are stored in the area E depending on the stock depth.

In step 42b, when T>=N (N is a configurable parameter value, such that it is defined as a large stock depth when N is exceeded), then the products A are SKUs with a large stock depth. When Qx>Qy, the products A are stored in the areas E and F at the same time, wherein the number of the products placed on each of the preceding (K−1) racks in the area F is Qyk=Qy/K (the result is rounded up), the Kth rack stores Qy−Qyk* (K−1) products, and all the remaining Qx−Qy products are stored in the area E in an entire rack manner. If the area E is in full storage, the products are further stored in the area F in an entire rack manner, and the exceeded number of the products are not required to be stored in a scattered manner; when Qx<=Qy, all the products A are stored in the area F, the number of the products placed on each of the preceding (K−1) racks is Qyk=Qx/K (the result is rounded up), and the Kth rack stores Qx−Qyk* (K−1) products.

In step 42c, when T<N (N is a configurable parameter value, such that it is defined as a large stock depth when N is exceeded), then the products A are SKUs with a small stock depth, and all stored in the area F. When Qx>Qy, the number of the products placed on each of the preceding (K−1) racks is Qyk=Qy/K (the result is rounded up), the Kth rack stores Qy−Qyk* (K−1) products, and all the remaining Qx−Qy products are further stored in the area F in an entire rack manner. When Qx<=Qy, the number of the products placed on each of the preceding (K−1) racks is Qyk=Qx/K (the result is rounded up), and the Kth rack stores Qx−Qyk* (K−1) products.

In step 43, it is determined whether the current order is the first type of order or the second type of order; and the operator is instructed to complete the sorting of the products in the human-machine collaborative operation area in the case where the current order is the first type of order or the second type of order.

In some embodiments of the present disclosure, the first type of order may be a boom order.

In some embodiments of the present disclosure, the second type of order may be a bulk order.

In some embodiments of the present disclosure, the first type of order is EN=1 and EQ>=1, and corresponds to an order with a relatively large average daily order volume of SKUs, wherein EN is the type of SKUs comprised in an order; and EQ is a total demand number of the products in an order, that is, the sum of a demand number of each SKU in an order.

In some embodiments of the present disclosure, in step 43, the step of determining whether the current order is the first type of order or the second type of order may comprise at least one of steps 431 and 432.

In step 431, the order is determined as the first type of order in the case where the type of the products contained in an order is 1, the total demand number of the products in an order is greater than or equal to 1, the stock depth of a corresponding product in an order is greater than or equal to a predetermined stock depth, and the corresponding product in an order is in stock in the human-machine collaborative operation area.

In step 432, the order is determined as the second type of order in the case that the demand number of the products in an order is greater than a predetermined demand number of the products, the stock depth of a corresponding product in an order is greater than or equal to a predetermined stock depth, and the corresponding product in an order is in stock in the human-machine collaborative operation area.

In some embodiments of the present disclosure, the step 43 may comprise: when the production in a human-machine collaborative mode is started, the system determines an order with EN=1 and EQ>=1 in which a corresponding SKU has a stock depth of T>=N, and the SKU is in stock in the area E, as the first type of order, and generate an independent manual picking task; for the second type of order in which a demand number of SKUs>=Q (Q is a demand number of a single SKU, which is a configurable parameter) and the SKU has a stock depth of T>=N and the SKU is in stock in the area E, such second type of order may also generate such an independent manual picking task that the task is received by the operator so as to complete the picking operation in a double-arrow passage in the area E.

In step 44, the replenishment between the human-machine collaborative operation area and the AGV operation area is completed by using an AGV.

In some embodiments of the present disclosure, the step 44 may comprise at least one of the step 441 and the step 442.

Instep 441, the product is replenished from the human-machine collaborative operation area to the AGV operation area in the case where the stock depth of a product is greater than or equal to a predetermined stock depth, the inventory of the product in the AGV operation area is lower than the safety inventory of the product, and the product is in stock in the human-machine collaborative operation area.

In some embodiments of the present disclosure, in the step 441, the step of replenishing the product from the human-machine collaborative operation area to the AGV operation area may comprise: replenishing the product with a number equal to the safety inventory to the first predetermined number of racks in the AGV operation area in a scattered manner.

In some embodiments of the present disclosure, the step 441 may comprise: when the inventory of the products in the area F is lower than the safety inventory, the system may automatically assign an AGV to carry racks from the area E to a workstation, and at the same time dispatch appropriate racks from the area F, and moves and supplements the products on the racks carried from the area E to the racks dispatched from the area F, so as to complete the replenishment of the area F.

In step 442, the rack of the product stored in an entire rack manner is carried from the AGV operation area and replenished to the human-machine collaborative operation area in the case where the stock depth of a product is greater than or equal to a predetermined stock depth, the inventory of the product in the AGV operation area is greater than the safe inventory of the product, the product stored in an entire rack manner is present in the AGV operation area, and the rack of the product is emptied in the human-machine collaborative operation area.

In some embodiments of the present disclosure, in the step 442, the condition that the rack of the product is emptied in the human-machine collaborative operation area may comprise that the number of racks on which the products are stored in the human-machine collaborative operation area is less than the predetermined number of racks.

In some embodiments of the present disclosure, the step 442 may comprise that after there is a rack emptied in the area E, the system assigns an AGV to carry the SKU rack with a large stock depth from the area F to the area E so as to complete automatic replenishment of the rack.

In some embodiments of the present disclosure, the step 44 may comprise at least one of steps 44a and 44b.

In step 44a, when the stock depth of the products A satisfies T>=N: when the stock of the products A in the area F is lower than Qy, if the products A are in stock in the area E, the system automatically triggers replenishment, such that the products are replenished from the area E to the area F by following the principle of scattered storage; when the inventory of the products A in the area F is greater than Qy, and the number of racks stored in the area E is less than M (M is a configurable parameter, which is set separately according to the sales volume of the SKUs), if the products A are stored in an entire rack manner in the area F, the system automatically assigns an AGV to carry and supplement the rack on which the products A are stored in an entire rack manner from the area F to the area E under the condition that the inventory of the products A in the area F is >=Qy.

In step 44b, when the stock depth T of the products A satisfies T<N, there is no need to replenish the products A.

In the above-described embodiments of the present disclosure, new solutions are formed for stock distribution by adjusting the layout of the AGV robot warehouse.

During the promotion in the above-described embodiments of the present disclosure, for a boom order and a bulk order, it is possible to instruct the operator to complete the sorting of the products in the route of the double-arrow, and may increase or decrease the operators according to the order quantity. In the above-described embodiments of the present disclosure, after there is a rack emptied in the area E, the system assigns an AGV to carry the SKU rack with a large stock depth from the area F to the area E so as to complete automatic replenishment of the rack. In the above-described embodiments of the present disclosure, when the inventory of the products in the area F is lower than the safety inventory, the system may automatically assign an AGV to carry racks from the area E to a workstation, and at the same time dispatch appropriate racks from the area F, and moves and supplements the products on the racks carried from the area E to the racks dispatched from the area F, so as to complete the replenishment of the area F.

Therefore, the above-described embodiments of the present disclosure greatly improve the production efficiency for a boom order and a bulk order during promotion. In the above-described embodiments of the present disclosure, it is possible to use an AGV to automatically carry the racks so as to complete the replenishment, thereby improving the operation efficiency.

Figure 5:
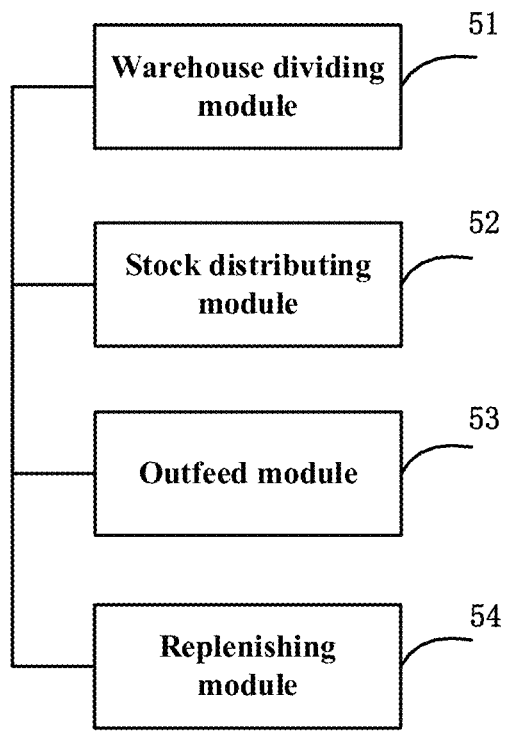
FIG. 5 is a schematic view of some embodiments of the flexible production device for a warehouse according to the present disclosure.

FIG. 5 is a schematic view of some embodiments of a flexible production device for a warehouse according to the present disclosure. As shown in FIG. 5, the flexible production device for a warehouse according to any one of the above-described embodiments of the present disclosure may comprise a warehouse dividing module 51, wherein:

The warehouse dividing module 51 is configured to divide the warehouse into a human-machine collaborative operation area and an AGV operation area, wherein in the AGV operation area, the AGV performs operations, and in the human-machine collaborative operation area, the AGV and the operator perform collaborative operations.

In some embodiments of the present disclosure, the warehouse dividing module 51 may be further configured to determine whether the current order is the first type of order or the second type of order; and instruct the operator to complete the sorting of the products in the human-machine collaborative operation area in the case where the current order is the first type of order or the second type of order.

In some embodiments of the present disclosure, as shown in FIG. 5, the flexible production device for a warehouse according to any one of the above-described embodiments of the present disclosure may further comprise a stock distributing module 52, wherein:

The stock distributing module 52 is configured to allocate the products in stock between the human-machine collaborative operation area and the AGV operation area according to a predetermined rule.

In some embodiments of the present disclosure, the stock distributing module 52 may be configured to determine whether the stock depth of the products is greater than or equal to a predetermined stock depth; to determine whether the inventory of the products is greater than the safety inventory of the products in the case where the stock depth of the products is greater than or equal to a predetermined stock depth; and to store the products in the human-machine collaborative operation area and the AGV operation area at the same time in the case where the stock depth of the products is greater than or equal to a predetermined stock depth, and the inventory of the products is greater than the safety inventory of the products.

In some embodiments of the present disclosure, the stock distributing module 52 may be configured to store the products with a number equal to the safety inventory are stored on the first predetermined number of racks of the AGV operation area in a scattered manner in the case where the products are stored in the human-machine collaborative operation area and the AGV operation area at the same time, wherein the first predetermined number is the number of outfeed workstations in the entire warehouse; the entire rack of a first remaining number of the products is stored in the human-machine collaborative operation area, wherein the first remaining number is a difference between the inventory of the products and the safety inventory of the products.

In some embodiments of the present disclosure, the stock distributing module 52 may be configured to determine whether a second remaining number is greater than or equal to the first remaining number in the case where the entire rack of a first remaining number of the products is stored in the human-machine collaborative operation area, wherein the second remaining number is the number of the products that may be stored in the remaining storage space of the human-machine collaborative operation area; to store the entire rack of a first remaining number of the products in the human-machine collaborative operation area in the case where the second remaining number is greater than or equal to the first remaining number; and to store the entire rack of a second remaining number of the products in the human-machine collaborative operation area, and the entire rack of a third remaining number of the products is stored in the automatic AGV operation area in the case where the second remaining number is less than the first remaining number, wherein the third remaining number is a difference between the first remaining number and the second remaining number.

In some embodiments of the present disclosure, the stock distributing module 52 may also be configured to store all the products in the inventory of the products on a first predetermined number of racks of the AGV operation area in a scattered manner in the case where the stock depth of the products is greater than or equal to a predetermined stock depth, and the inventory of the products is less than or equal to the safety inventory of the products, wherein the first predetermined number is the number of outfeed workstations in the entire warehouse.

In some embodiments of the present disclosure, the stock distributing module 52 may also be configured to determine whether the inventory of the products is greater than the safety inventory of the products in the case where the stock depth of the products is less than the predetermined stock depth; and to store the products with a number equal to the safety inventory on the first predetermined number of racks of the AGV operation area in a scattered manner in the case where the stock depth of the products is less than the predetermined stock depth and the inventory of the products is greater than the safety inventory of the products, wherein the first predetermined number is the number of outfeed workstations in the entire warehouse; the entire rack of a first remaining number of the products is stored in the AGV operation area, wherein the first remaining number is a difference between the inventory of the products and the safety inventory of the products.

In some embodiments of the present disclosure, the stock distributing module 52 may also be configured to store all the products in the inventory of the products on a first predetermined number of racks of the AGV operation area in a scattered manner in the case where the stock depth of the products is less than a predetermined stock depth, and the inventory of the products is less than or equal to the safety inventory of the products, wherein the first predetermined number is the number of outfeed workstations in the entire warehouse.

In some embodiments of the present disclosure, in the case of storing the products with a number equal to the safety inventory on the first predetermined number of racks of the AGV operation area in a scattered manner, the stock distributing module 52 may be configured to store a third predetermined number of the products on the preceding second predetermined number of racks in the first predetermined number of racks, wherein the second predetermined number is equal to the first predetermined number minus 1, and the third predetermined number is obtained by rounding up the quotient of the safety inventory and the second predetermined number; and to store the fourth predetermined number of the products on the last rack in the first predetermined number of racks, wherein the fourth predetermined number is a difference between the safety inventory and the fifth predetermined number, and the fifth predetermined number is the product of the second predetermined number and the third predetermined number.

In some embodiments of the present disclosure, as shown in FIG. 5, the flexible production device for a warehouse according to any one of the above-described embodiments of the present disclosure may further comprise an outfeed module 53, wherein:

The outfeed module 53 is configured to determine whether the current order is the first type of order or the second type of order; and instruct the operator to complete the sorting of the products in the human-machine collaborative operation area in the case where the current order is the first type of order or the second type of order.

In some embodiments of the present disclosure, the outfeed module 53 may be configured to determine the order as the first type of order in the case where the type of the products contained in an order is 1, the total demand number of the products in an order is greater than or equal to 1, the stock depth of a corresponding product in an order is greater than or equal to a predetermined stock depth, and the corresponding product in an order is in stock in the human-machine collaborative operation area.

In some embodiments of the present disclosure, the outfeed module 53 may be configured to determine the order as the second type of order in the case that the demand number of the products in an order is greater than a predetermined demand number of the products, the stock depth of a corresponding product in an order is greater than or equal to a predetermined stock depth, and the corresponding product in an order is in stock in the human-machine collaborative operation area.

In some embodiments of the present disclosure, as shown in FIG. 5, the flexible production device for a warehouse according to any one of the above-described embodiments of the present disclosure may further comprise a replenishing module 54, wherein:

The replenishing module 54 is configured to complete the replenishment between the human-machine collaborative operation area and the AGV operation area by using an AGV.

In some embodiments of the present disclosure, the replenishing module 54 may be configured to replenish the product from the human-machine collaborative operation area to the AGV operation area in the case where the stock depth of a product is greater than or equal to a predetermined stock depth, the inventory of the product in the AGV operation area is lower than the safety inventory of the product, and the product is in stock in the human-machine collaborative operation area.

In other embodiments of the present disclosure, the replenishing module 54 may be configured to carry the rack of the product stored in an entire rack manner from the AGV operation area and replenish to the human-machine collaborative operation area in the case where the stock depth of a product is greater than or equal to a predetermined stock depth, the inventory of the product in the AGV operation area is greater than the safe inventory of the product, the product stored in an entire rack manner is present in the AGV operation area, and the rack of the product is emptied in the human-machine collaborative operation area.

In some embodiments of the present disclosure, the flexible production device for a warehouse may be configured to perform operations for implementing the flexible production method described in any one of the above-described embodiments (for example, the embodiment of FIG. 3 or FIG. 4).

Figure 6:
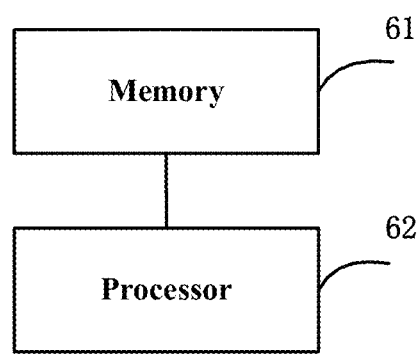
FIG. 6 is a schematic view of other embodiments of the flexible production device for a warehouse according to the present disclosure.

FIG. 6 is a schematic view of other embodiments of the flexible production device for a warehouse according to the present disclosure. As shown in FIG. 6, the flexible production device for a warehouse according to any one of the above-described embodiments of the present disclosure may comprise a memory 61 and a processor 62, wherein:

The memory 61 is configured to store instructions.

The processor 62 is configured to execute the instructions, so that the flexible production device for a warehouse is configured to perform operations for implementing the flexible production method described in any one of the above-described embodiments (for example, the embodiment of FIG. 3 or FIG. 4).

Based on the flexible production device for a warehouse provided by the above-described embodiments of the present disclosure, new solutions are formed for stock distribution by adjusting the layout of the AGV robot warehouse.

During the promotion in the above-described embodiments of the present disclosure, for a boom order and a bulk order, it is possible to instruct the operator to complete the sorting of the products in the route of the double-arrow, and may increase or decrease the operators according to the order quantity. In the above-described embodiments of the present disclosure, after there is a rack emptied in the area E, the system assigns an AGV to carry the SKU rack with a large stock depth from the area F to the area E so as to complete automatic replenishment of the rack. In the above-described embodiments of the present disclosure, when the inventory of the products in the area F is lower than the safety inventory, the system may automatically assign an AGV to carry racks from the area E to a workstation, and at the same time dispatch appropriate racks from the area F, and moves and supplements the products on the racks carried from the area E to the racks dispatched from the area F, so as to complete the replenishment of the area F.

Therefore, the above-described embodiments of the present disclosure greatly improve the production efficiency for a boom order and a bulk order during promotion. In the above-described embodiments of the present disclosure, it is possible to use an AGV to automatically carry the racks so as to complete the replenishment, thereby improving the operation efficiency.

According to another aspect of the present disclosure, a computer readable storage medium is provided, wherein the computer readable storage medium stores computer instructions that, when executed by a processor, implement the flexible production method according to any one of the above-described embodiments.

Based on the computer-readable storage medium provided by the above-described embodiments of the present disclosure, it is possible to greatly improve the production efficiency for a boom order and a bulk order during promotion. In the above-described embodiments of the present disclosure, it is possible to use an AGV to automatically carry the racks so as to complete the replenishment, thereby improving the operation efficiency.

The flexible production device for a warehouse described above may be implemented as a general purpose processor, a programmable logic controller (PLC), a digital signal processor (DSP), an application specific integrated circuit (ASIC), afield-programmable gate array (FPGA) or other programmable logic devices, discrete gates or transistor logic devices, discrete hardware assemblies or any proper combination thereof, which is configured to perform the functions described in the present application.

Hitherto, the present disclosure has been described in detail. Some details well known in the art are not described in order to avoid obscuring the concept of the present disclosure. According to the above description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a computer-readable storage medium. The storage medium as mentioned above may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure so as to design various embodiments adapted to particular purposes and comprising various modifications.

What is claimed is:

1. A flexible production method for a warehouse, comprising:
    dividing the warehouse into a human-machine collaborative operation area and an automated guided vehicle operation area;
    allocating products in stock between the human-machine collaborative operation area and the automated guided vehicle operation area according to a predetermined rule, wherein the allocating products in stock between the human-machine collaborative operation area and the automated guided vehicle operation area according to a predetermined rule comprises:
        determining whether a stock depth of the products is greater than or equal to a predetermined stock depth;
        determining whether an inventory of the products is greater than a safety inventory of the products in the case where the stock depth of the products is greater than or equal to the predetermined stock depth; and storing the products in the human-machine collaborative operation area and the automated guided vehicle operation area at the same time in the case where the stock depth of the products is greater than or equal to the predetermined stock depth, and the inventory of the products is greater than the safety inventory of the products;

setting a travel route of an automated guided vehicle and a walking route of an operator in the human-machine collaborative operation area, wherein the automated guided vehicle travels along the travel route of the automated guided vehicle, and the operator walks along the walking route of the operator; and completing replenishment between the human-machine collaborative operation area and the automated guided vehicle operation area by using the automated guided vehicle and the travel route, wherein the completing the replenishment comprises at least one of the following steps, wherein:

replenishing the product from the human-machine collaborative operation area to the automated guided vehicle operation area in the case where the stock depth of a product is greater than or equal to a predetermined stock depth, the inventory of the product in the automated guided vehicle operation area is lower than the safety inventory of the product, and the product is in stock in the human-machine collaborative operation area; and carrying the rack of the product stored in an entire rack manner from the automated guided vehicle operation area and replenishing to the human-machine collaborative operation area in the case where the stock depth of a product is greater than or equal to a predetermined stock depth, the inventory of the product in the automated guided vehicle operation area is greater than the safe inventory of the product, the product stored in an entire rack manner is present in the automated guided vehicle operation area, and the rack of the product is emptied in the human-machine collaborative operation area, wherein the replenishing the product from the human-machine collaborative operation area to the automated guided vehicle operation area comprises: replenishing the products with a number equal to the safety inventory to a first predetermined number of racks in the automated guided vehicle operation area in a scattered manner, wherein the first predetermined number is a number of outfeed workstations in the entire warehouse.

2. The flexible production method according to claim 1, wherein the storing the products in the human-machine collaborative operation area and the automated guided vehicle operation area at the same time comprises:

storing the products with the number equal to the safety inventory on the first predetermined number of racks in the automated guided vehicle operation area in the scattered manner, wherein the first predetermined number is the number of outfeed workstations in the entire warehouse; and storing the entire rack of a first remaining number of the products in the human-machine collaborative operation area, wherein the first remaining number is a difference between the inventory of the products and the safety inventory of the products.

3. The flexible production method according to claim 2, wherein the storing the entire rack of a first remaining number of the products in the human-machine collaborative operation area comprises:

determining whether a second remaining number is greater than or equal to the first remaining number, wherein the second remaining number is the number of the products that may be stored in the remaining storage space of the human-machine collaborative operation area;

storing the entire rack of the first remaining number of the products in the human-machine collaborative operation area in the case where the second remaining number is greater than or equal to the first remaining number; and storing the entire rack of the second remaining number of the products in the human-machine collaborative operation area, and storing the entire rack of a third remaining number of the products in the automatic automated guided vehicle operation area in the case where the second remaining number is less than the first remaining number, wherein the third remaining number is a difference between the first remaining number and the second remaining number.

4. The flexible production method according to claim 1, wherein the allocating products in stock between the human-machine collaborative operation area and the automated guided vehicle operation area according to a predetermined rule further comprises:

storing all the products in the inventory of the products on the first predetermined number of racks of the automated guided vehicle operation area in the scattered manner in the case where the stock depth of the products is greater than or equal to the predetermined stock depth, and the inventory of the products is less than or equal to the safety inventory of the products, wherein the first predetermined number is the number of outfeed workstations in the entire warehouse.

5. The flexible production method according to claim 1, wherein the allocating products in stock between the human-machine collaborative operation area and the automated guided vehicle operation area according to a predetermined rule further comprises:

determining whether an inventory of the products is greater than a safety inventory of the products in the case where the stock depth of the products is less than the predetermined stock depth; and storing the products with a number equal to the safety inventory on the first predetermined number of racks of the automated guided vehicle operation area in a scattered manner in the case where the stock depth of the products is less than the predetermined stock depth and the inventory of the products is greater than the safety inventory of the products, wherein the first predetermined number is the number of outfeed workstations in the entire warehouse; the entire rack of a first remaining number of the products is stored in the automated guided vehicle operation area, wherein the first remaining number is a difference between the inventory of the products and the safety inventory of the products.

6. The flexible production method according to claim 5, wherein the allocating products in stock between the human-machine collaborative operation area and the automated guided vehicle operation area according to a predetermined rule further comprises:

storing all the products in the inventory of the products on a first predetermined number of racks of the automated guided vehicle operation area in a scattered manner in the case where the stock depth of the products is less than the predetermined stock depth, and the inventory of the products is less than or equal to the safety inventory of the products, wherein the first predetermined number is the number of outfeed workstations in the entire warehouse.

7. The flexible production method according to claim 5, wherein the storing the products with a number equal to the safety inventory on a first predetermined number of racks in the automated guided vehicle operation area in a scattered manner comprises:

storing a third predetermined number of the products on the preceding second predetermined number of racks in the first predetermined number of racks, wherein the second predetermined number is equal to the first predetermined number minus 1, and the third predetermined number is obtained by rounding up the quotient of the safety inventory and the second predetermined number; and storing a fourth predetermined number of the products on the last rack in the first predetermined number of racks, wherein the fourth predetermined number is a difference between the safety inventory and the fifth predetermined number, and the fifth predetermined number is a product of the second predetermined number and the third predetermined number.

8. The flexible production method according to claim 1, further comprising:

determining whether a current order is a first type of order or a second type of order; and instructing an operator to complete the sorting of the products in the human-machine collaborative operation area in the case where the current order is the first type of order or the second type of order.

9. The flexible production method according to claim 8, wherein the determining whether a current order is the first type of order comprises:

determining the order as the first type of order in the case where the type of the products contained in an order is 1, the total demand number of the products in an order is greater than or equal to 1, the stock depth of a corresponding product in an order is greater than or equal to a predetermined stock depth, and the corresponding product in an order is in stock in the human-machine collaborative operation area; or the determining whether a current order is the second type of order comprises:

determining the order as the second type of order in the case that the demand number of the products in an order is greater than a predetermined demand number of the products, the stock depth of a corresponding product in an order is greater than or equal to a predetermined stock depth, and the corresponding product in an order is in stock in the human-machine collaborative operation area.

10. The flexible production method according to claim 1, wherein a condition that the rack of the product is emptied in the human-machine collaborative operation area comprises that:

the number of racks on which the products are stored in the human-machine collaborative operation area is less than the predetermined number of racks.

11. A non-transitory computer readable storage medium, wherein the non-transitory computer readable storage medium stores computer instructions, which, when executed by a processor, implement the flexible production method according to claim 1.

12. A flexible production device for a warehouse, comprising:

a memory configured to store instructions; and a processor configured to execute a method for performing instructions comprising:

dividing the warehouse into a human-machine collaborative operation area and an automated guided vehicle operation area;

allocating products in stock between the human-machine collaborative operation area and the automated guided vehicle operation area according to a predetermined rule, wherein the allocating products in stock between the human-machine collaborative operation area and the automated guided vehicle operation area according to a predetermined rule comprises:

determining whether a stock depth of the products is greater than or equal to a predetermined stock depth;

determining whether an inventory of the products is greater than a safety inventory of the products in the case where the stock depth of the products is greater than or equal to the predetermined stock depth; and storing the products in the human-machine collaborative operation area and the automated guided vehicle operation area at the same time in the case where the stock depth of the products is greater than or equal to the predetermined stock depth, and the inventory of the products is greater than the safety inventory of the products;

setting a travel route of an automated guided vehicle and a walking route of an operator in the human-machine collaborative operation area, wherein the automated guided vehicle travels along the travel route of the automated guided vehicle, and the operator walks along the walking route of the operator; and completing replenishment between the human-machine collaborative operation area and the automated guided vehicle operation area by using the automated guided vehicle and the travel route, wherein the completing the replenishment comprises at least one of the following steps, wherein:

replenishing the product from the human-machine collaborative operation area to the automated guided vehicle operation area in the case where the stock depth of a product is greater than or equal to a predetermined stock depth, the inventory of the product in the automated guided vehicle operation area is lower than the safety inventory of the product, and the product is in stock in the human-machine collaborative operation area; and carrying the rack of the product stored in an entire rack manner from the automated guided vehicle operation area and replenishing to the human-machine collaborative operation area in the case where the stock depth of a product is greater than or equal to a predetermined stock depth, the inventory of the product in the automated guided vehicle operation area is greater than the safe inventory of the product, the product stored in an entire rack manner is present in the automated guided vehicle operation area, and the rack of the product is emptied in the human-machine collaborative operation area,
wherein the replenishing the product from the human-machine collaborative operation area to the automated guided vehicle operation area comprises: replenishing the products with a number equal to the safety inventory to a first predetermined number of racks in the automated guided vehicle operation area in a scattered manner, wherein the first predetermined number is a number of outfeed workstations in the entire warehouse.

13. The flexible production device according to claim 12, wherein the storing the products in the human-machine collaborative operation area and the automated guided vehicle operation area at the same time comprises:
storing the products with the number equal to the safety inventory on the first predetermined number of racks in the automated guided vehicle operation area in the scattered manner, wherein the first predetermined number is the number of outfeed workstations in the entire warehouse; and
storing the entire rack of a first remaining number of the products in the human-machine collaborative operation area, wherein the first remaining number is a difference between the inventory of the products and the safety inventory of the products.

14. The flexible production device according to claim 12, wherein the instructions further comprise:
determining whether a current order is a first type of order or a second type of order; and
instructing an operator to complete the sorting of the products in the human-machine collaborative operation area in the case where the current order is the first type of order or the second type of order.

* * * * *